Aug. 7, 1945. R. L. EVANS ET AL Re. 22,660

METHOD OF AND MEANS FOR WAVING HAIR

Original Filed May 23, 1934

INVENTORS
RALPH L. EVANS
EVERETT G. McDONOUGH
BY Richard E. Marine
ATTORNEY

Reissued Aug. 7, 1945

Re. 22,660

UNITED STATES PATENT OFFICE 22,660

METHOD OF AND MEANS FOR WAVING HAIR

Ralph L. Evans, New York, and Everett G. McDonough, Yonkers, N. Y., assignors to Zotos Corporation, New York, N. Y., a corporation of New York Original No. 2,111,558, dated March 22, 1938, Serial No. 727,154, May 23, 1934. Application for reissue March 22, 1940, Serial No. 325,466

15 Claims. (Cl. 132—36.2)

Our invention relates generally to the art of chemical heaters and in its more specific aspect to the art of producing a so-called "permanent wave" in living human hair by subjecting the hair to heat produced by exothermic reaction of a chemical mixture in proximity thereto.

Our invention presents many advantages in the composition of the chemicals or chemical mixtures used in the method of producing a permanent wave where the heat is generated by exothermic means.

We have been able to prepare compositions which are not sensitive to atmospheric influences. In mixtures heretofore used, atmospheric moisture and/or atmospheric carbon dioxide are readily absorbed and by thus decreasing the amount of heat available render the containing device useless after a short time. It is true that this difficulty may be overcome by mechanical means such as the use of moisture-impermeable wrappings and/or sealing the finished pads within a metal container, but these expedients add to the production costs and are liable to failures from incomplete closure.

The heat generating ingredients heretofore used upon being wetted with water would swell as the reaction progressed. This swelling could be controlled by additions of proper materials but serious difficulties were still present in practical use. For instance, the removal of the pads from the confining container in the so-called "Croquignole method" frequently required the use of considerable force. Also, in the "spiral method" there was danger of bursting the overlapping parchment by the swelling chemical within the pad. Resulting spilled powder could make an annoying mess or a bursting device accompanied by escaping steam could result in a burn to the person whose hair is being waved. These disadvantages are overcome in our invention, without the necessity of adding another material, by the use of substances whose reactions inherently do not give rise to swelling or bursting.

Moreover, ingredients heretofore used produce a reaction when wet with water whose total exothermic heat might be barely sufficient to impart a wave to a properly treated strand of hair. To obtain more heat it would be necessary to increase proportionally the amounts (volumes and weights) of ingredients used. This makes the pad bulky and unwieldy for practical use and increases the weight and enhances the objectionable swelling referred to in the preceding paragraph.

By our invention we are able to vary the total heat generated within very wide limits without unduly increasing the total weight. A simple change in proportions of ingredients is here utilized to effect the desired change.

Production difficulties arise from the use of ingredients heretofore employed. The most commonly used material is quick-lime and the chemical properties of this material are well known to be easily altered during its production; variation in the source of limestone or the method of burning gives limes of entirely different heat generating activities. The handling of such sensitive materials necessitates utmost care because of the atmospheric influences above referred to. Continuous chemical control during manufacture and handling by checking and re-checking is necessary for uniform performance. These difficulties are obviated by our invention.

Basically there are available three general types of reaction which produce exothermic heat (1) neutralization (2) hydration (3) oxidation and reduction. Of these the oxidation-reduction type, to which this invention relates, presents advantages in the permanent waving of hair not possessed by the other two types of exothermic reactions.

In an oxidation-reduction reaction it is necessary for a transfer of electrons to take place; the substance or ion or radical being oxidized loses one or more electrons whereas the substance or ion or radical being reduced gains one or more electrons.

In nearly all classes of oxidation-reduction reactions in contact with water we have found that it is particularly necessary to control the hydrogen ion concentration in order to get the desired rate of transfer of electrons. In other words, the speed of the reaction is usually a function of the hydrogen ion concentration.

We have also found that the speed of the reaction at the optimum hydrogen ion concentration can be influenced by the addition of substances known as catalysts either acting in a single capacity or preferably performing a double function, i. e., one, to assist in the ready acceptance of the electron by the substance to be reduced and, two, to assist the ready release of the electron from the substance to be oxidized.

Where the substances are pre-mixed in the dry state and water is later added to start the reaction, we have found that particle size will greatly influence the rate of heat evolution. The rate of solution is directly related to size of the particle being dissolved. Also if the oxidation-reduction system is heterogeneous the finer the particles of the substance in the solid state the faster will be the rate of reaction.

In the use of an oxidation-reduction reaction in the confinement of a small pack, we have found that it is frequently desirable not only to carefully control the speed of reaction but also to have present an absorbent material so that there will be no leakage of the solution. To this end we may advantageously rely upon a watery paste to hold the liquid within the pack. The absorbent material also acts as a diluent and gives more even distribution of chemicals so that a steady and easily regulated reaction occurs.

By these various controls of the speed of the exothermic reaction we are able to effect the proper time-temperature relationship for imparting a permanent wave to hair.

We have found that the type of oxidation-reduction reaction most easily adapted to be used in a small pack and possessing advantages most needed in this method of permanent waving is one which utilizes a substance to be oxidized which under the proper conditions easily loses electrons and a substance to be reduced which easily acquires electrons. Examples of the first are metals such as magnesium, zinc, aluminum, iron, etc., or inorganic ions such as sulfite ion or thiosulfate ion, or organic materials ranging from simple ones like formic or oxalic acid to the myriad of much more complex reducing agents, or nonmetals as sulfur, phosphorus, etc. Examples of the second are (*a*) oxygen rich materials—permanganates, persulfates, peroxides, chlorates, nitrates, etc.; (*b*) metal oxides, particularly heavy metal oxides—copper oxide, lead oxide, iron oxide, etc.; (*c*) nonmetals—oxygen, sulfur, halogens, etc.

We have further found that the speed of transfer of electrons is influenced by the hydrogen ion concentration and although very low hydrogen ion concentration often permits a reaction, such a system is sensitive to atmospheric influences, since it absorbs carbon dioxide from the air and changes this factor. On the other hand, we have found that high hydrogen concentration often increases the speed of electron transfer in such a reaction mixture. Too high hydrogen ion concentration, however, may cause undesirable by-product reaction, as for instance, hydrogen formation or the formation of free halogen or halogen oxide in a system unsuitable for their presence, or the complete solution or destruction of the catalyst or the absorbent material. We have found that the proper hydrogen ion concentration can be obtained from various substances; especially useful are such acidic materials as (*a*) small amounts of strong acids or larger amounts of weak acids, (*b*) acid salts such as bisulfates, acid phosphates, bitartrates, etc.; (*c*) salts of strong acids with weak bases e. g.—aluminum sulfate, magnesium chloride, zinc chloride, etc., (*d*) salts capable of forming acidic solutions, such as persulfates, pyrocompounds, etc.

In order to regulate the rate of the electron transfer at the optimum hydrogen ion concentration, we may add a substance which enters the reaction in such a way that it both assists in the removal of the electron by the substance to be oxidized and/or accelerates the acceptance of the electron by the substance to be reduced. For example, in reactions where the substance to lose electrons is a metal such as zinc or aluminum and the substance to gain an electron is an ion such as persulfate, permanganate or chlorate ion, and the hydrogen ion concentration is properly controlled by such a substance as sodium dihydrogen phosphate or sodium bisulphate, we have found that the addition of a substance such as an oxygen unsaturated metal oxide or salt, e. g.—copper oxide, will act in such a manner as to accelerate the electron transfer. In this particular example cited copper oxide in contact with a solution of sufficient hydrogen ion concentration will react to form nascent metallic copper and copper ion; the nascent metallic copper functioning to assist the metal aluminum to lose electrons and the copper ion functioning to assist the chlorate ion in accepting electrons. While we prefer to employ electron transfer materials of the character indicated, others also may be used, such as the heavy metals and their compounds.

We have further found that the most suitable absorbent materials to add to such a system are inert substances such as silica, clay, titanium oxide, barium sulphate, calcium sulphate, or in fact, any suitable composition which will not react with the other materials employed. These materials possess the added advantages among others of making premature reaction or explosion from the close frictional contact of oxidizing and reducing materials impossible, of being unaffected by atmospheric influences, of effecting even distribution of the chemicals and steadying the reaction and when made as a watery paste of holding the system within the pack; some have low apparent density by which property they give volume and permit easy dilution without materially increasing the weight.

Such a system as we have just described consisting of an oxidizable material, a reducible material, a hydrogen ion control material, an electron transfer material, and a water absorbent diluent material has the merits, among others, that it will not be affected by atmospheric influence, it will not swell as the reaction proceeds, a wide variation in quantity of heat generated can be obtained without any objectional increase in weight or volume, production and manufacture will be easy and stringent chemical control of production will be unnecessary. By way of exemplification but without limiting our invention or claim thereto, the following is given as typical example of a chemical mixture which will generate heat by electron transfer when wet with water:

| | Parts |
|---|---|
| Aluminum | 20– 60 |
| Sodium persulfate | 50– 500 |
| Maleic acid | 50– 150 |
| Copper oxide | 40– 100 |
| Fuller's earth | 500–1000 |

In applying our chemical mixture to the waving of hair we may employ any suitable apparatus, such for instance, as that disclosed in the patent to Evans 1,927,544 and shown in the accompanying drawing, in which—

Figure 1:
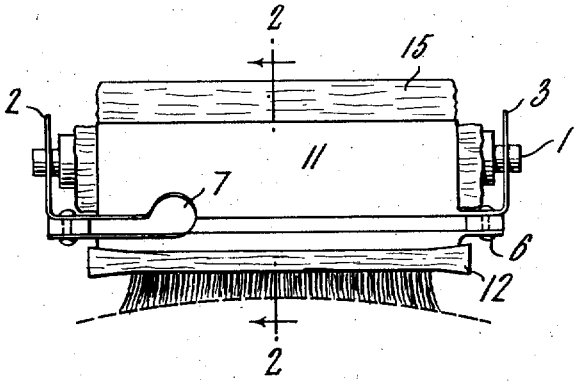
Fig. 1 is a side view of a hair waving apparatus in use.
Figure 2:
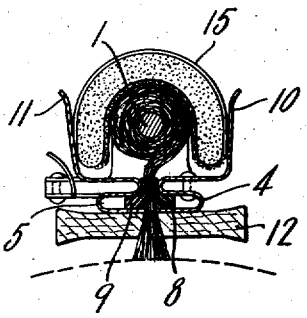
Fig. 2 is a transverse cross-section taken on the line 2—2 of Fig. 1.
Figure 3:
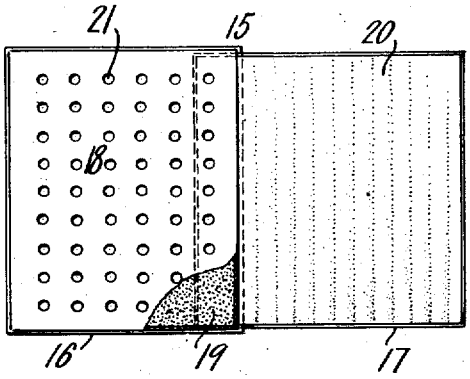
Fig. 3 is an inside plan view of a pad containing the chemical mixture, said pad being shown in unfolded condition.
Figure 4:
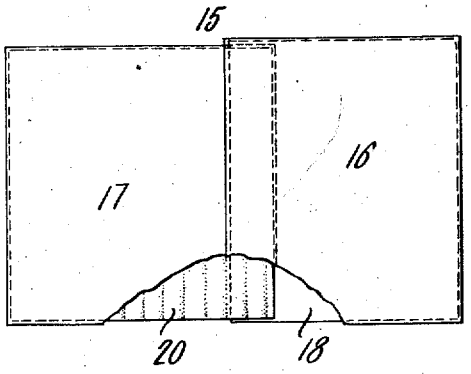
Fig. 4 is an outside plan view of the same.

The tress to be waved is shown as wound on a mandrel 1, mounted between two end members 2, 3, carried by two clamp members 4, 5, hinged at 6, and held together at their free ends by a locking member 7. The clamp members are provided with hair-engaging strips 8, 9, of suitable yielding insulating material and have uprising sides 10, 11 operating to shield the scalp from heat and vapor. A pad 12 is interposed between the tress clamp and the scalp for a similar purpose.

The heating pad 15 is shown as comprising a backing portion 16, a foldable portion 17, an envelope 18 preferably of impervious material, as foil, which contains the exothermic material 19, the envelope being attached as by adhesive, or similar means, to the backing portion 16; and a sheet of absorbent material 20, as cotton fabric or blotting paper, secured in position to be folded across the face of the exothermic material containing envelope 18. Inasmuch as our exothermic material does not deteriorate when exposed to air the exposed face of the envelope may conveniently be provided with perforations 21 in the manufacture of the pad, thus obviating the necessity of making these perforations at the time the pad is used, or if made at the time of manufacture, obviating the necessity of sealing such perforations by means of an additional impervious sheet, as has heretofore been the practice.

In practice, the absorbent sheet is wetted by water or a suitable waving solution and folded across the perforated face of the envelope. The pad is then bent in U-shape and applied about the tress on the mandrel 1, being held in place by the sides 10 and 11 of the clamp.

It is evident that many changes may be made without departing from the spirit and scope of our invention.

We claim:

1. Means for producing the proper time-temperature relationships for the permanent waving of hair including a chemical mixture which when treated with water will generate heat sufficient to impart a permanent wave, said chemical mixture comprising—

| | Parts |
|---|---|
| Aluminum | 20– 60 |
| Sodium persulfate | 50– 500 |
| Maleic acid | 50– 150 |
| Copper oxide | 40– 100 |
| Fuller's earth | 500–1000 |

2. The method of producing the proper time-temperature relationships for the permanent waving of hair including preforming a tress of hair, providing a chemical or chemical mixture including—

| | Parts |
|---|---|
| Aluminum | 20– 60 |
| Sodium persulfate | 50– 500 |
| Maleic acid | 50– 150 |
| Copper oxide | 40– 100 |
| Fuller's earth | 500–1000 |

causing a reaction between said components to effect the generation of heat, and applying the generated heat to the preformed hair.

3. Means for producing the proper time-temperature relationships for the permanent waving of hair, including a chemical mixture which, when treated with water, will generate hair waving temperatures by an oxidation-reduction reaction of the mixture's components, the chemical mixture comprising an electron-losing material selected from the group of reducers consisting of magnesium, zinc, aluminum, iron, an electron-accepting material selected from the group of oxidizers consisting of permanganates, persulfates, peroxides, chlorates, nitrates, and metal oxides, a solid material to give proper hydrogen ion concentration selected from the group consisting of salts capable of forming acidic solution, acidic salts and acids, copper oxide to regulate electron transfer and an inert solid absorbent.

4. Means for producing the proper time-temperature relationships for the permanent waving of hair, including a chemical mixture which, when treated with water, will generate hair waving temperatures by an oxidation-reduction reaction of the mixture's components, the chemical mixture comprising, an electron-losing material selected from the group of reducers consisting of magnesium, zinc, aluminum, iron, an electron-accepting material selected from the group of oxidizers consisting of permanganates, persulfates, peroxides, chlorates, nitrates, and metal oxides a solid material to give proper hydrogen ion concentration selected from the group consisting of salts capable of forming acidic solutions, acidic salts and acids, a copper containing material to form nascent metallic copper and copper ions upon water addition to the mixture, and an inert solid absorbent.

5. Means for producing the proper time-temperature relationships for the permanent waving of hair including a chemical mixture which will generate heat at hair waving temperatures, the chemical mixture comprising: oxidizing and reducing substances which when treated with an aqueous medium generates the heat by a chemical reaction of the substances; solid material for regulating the hydrogen ion concentration; means for accelerating electron acceptance, or of electron loss, or of both, comprising a copper containing material to form nascent metallic copper and copper ions upon water addition to the mixture; said last two means coacting to regulate the rate of the heat generation and to effect the proper sequential time-temperature relationship for imparting a permanent wave to hair; and an inert solid absorbent.

6. Method of permanently waving hair which comprises: preforming a tress of hair in the desired form, providing means for producing the proper time-temperature relationships for the permanent waving of hair, including a chemical mixture comprising, an electron-losing material, an electron-accepting material, a solid material to give proper hydrogen ion concentration, a copper containing material to form nascent metallic copper and copper ions upon water addition to the mixture, and an inert solid absorbent, said means coacting when moistened to regulate the rate of heat generation and to effect the proper sequential time-temperature relationship for imparting a permanent wave to hair, and applying the generated heat to the preformed tress of hair.

7. An exothermic hair waving mixture for producing the proper time-temperature relationships for the permanent waving of hair by an oxidation-reduction reaction of the mixture's components, said mixture including: a substance to be oxidized which easily loses electrons, in an amount proportional to 20–60 parts; a substance to be reduced which easily acquires electrons, in an amount proportional to 50–500 parts; a solid substance to control hydrogen ion concentration, in an amount proportional to 50–150 parts; a copper containing material to form nascent metallic copper and copper ions upon water addition to the mixture for regulating the rate of electron transfer, in an amount proportional to 40–100 parts; and an inert solid absorbent in an amount proportional to 500–1000 parts.

8. An exothermic hair waving mixture for producing the proper time-temperature relationships for the permanent waving of hair by an oxidation-reduction reaction of the mixture's components, said mixture including: a solid substance to be oxidized, in an amount proportional to 20–60 parts, said substance being selected from the group consisting of magnesium, zinc, aluminum and iron; a substance to be reduced, in an amount proportional to 50–500 parts; a solid water soluble substance to accelerate the oxidation-reduction reaction by controlling the hydrogen ion concentration, in an amount proportional to 50–150 parts; a copper containing material to form nascent metallic copper and copper ions upon water addition to the mixture, in an amount proportional to 40–100 parts; and an inert solid absorbent in an amount proportional to 500–1000 parts.

9. A hair waving pack containing a chemical mixture for producing the proper time-temperature relationships for the permanent waving of hair which, when treated with water, generates hair waving temperatures by an oxidation-reduction reaction of the mixture's components, the chemical mixture comprising: a metal as the reducing agent to lose electrons to the oxidizer, said metal being selected from the group consisting of magnesium, zinc, aluminum, iron; a solid oxidizing agent easily acquiring electrons; a solid water soluble substance to accelerate the oxidation-reduction reaction by controlling the hydrogen ion concentration; a material to regulate electron transfer to effect the desired hair waving time-temperature relationship, being a copper-containing material to form nascent copper metal and copper ions upon water addition to the mixture; and an inert solid absorbent material.

10. Means for producing the proper time-temperature relationships for the permanent waving of hair including a chemical mixture which will generate heat at hair waving temperatures by an oxidation-reduction reaction of the mixture's components, the chemical mixture comprising: an electron-losing material; an electron-accepting material; a solid substance in amount to regulate the hydrogen ion concentration and to accelerate the transfer of electrons from the electron-losing material to the electron-accepting material, said substance being a salt of a strong acid and a weak base and a copper containing material to form nascent metallic copper and copper ions upon water addition to the mixture, to effect the desired hair waving time-temperature relationship; and an inert solid absorbent material.

11. Means for producing the proper time-temperature relationships for the permanent waving of hair including a chemical mixture which will generate heat at hair waving temperature by an oxidation-reduction reaction of the mixture's components, the material comprising: an organic reducing material, an oxidizer selected from the group consisting of permangantes, persulfates, peroxides, chlorates, nitrates, and metal oxides; a solid material for controlling hydrogen ion concentration; a copper containing material to form nascent metallic copper and copper ions upon water addition to the mixture; and an inert solid absorbent material; in relative amounts to effect the desired hair waving time-temperature relationship.

12. Means for producing the proper time-temperature relationships for the permanent waving of hair including a chemical mixture which will generate hair waving temperatures by an oxidation-reduction reaction of the mixture's components, the chemical mixture comprising: an oxidizer; an organic reducing agent; a solid material for regulating the hydrogen ion concentration; a copper containing material to form nascent metallic copper and copper ions upon water addition to the mixture; and an inert solid absorbent.

13. Means for producing the proper time-temperature relationships for the permanent waving of hair, including a chemical mixture or chemical comprising: aluminum metal, a chlorate oxidizing agent, an acidic solid material, a copper containing material to form nascent metallic copper and copper ions upon water addition to the mixture, and inert solid absorbent material, said means coacting to regulate the rate of heat generation and to effect the proper sequential time-temperature relationship for imparting a permanent wave to the hair.

14. Method of permanently waving hair which comprises: preforming a tress of hair in the desired form, providing means for producing the proper time-temperature relationships for the permanent waving of hair, including a chemical mixture of chemical containing aluminum metal, a chlorate oxidizer, an acidic solid material, a copper containing material to form nascent metallic copper and copper ions upon water addition to the mixture, and inert solid absorbent material, said means coacting when moistened to regulate the rate of heat generation and to effect the proper sequential time-temperature relationship for imparting a permanent wave to the hair, and applying the generated heat to the preformed tress of hair.

15. Means for producing the proper time-temperature relationships for the permanent waving of hair, including a chemical mixture which, when treated with water, will generate hair waving temperatures by an oxidation-reduction reaction of the mixture's components, the chemical mixture comprising, an electron-losing material, an electron-accepting material, a solid material to give proper hydrogen ion concentration, a copper containing material to form nascent metallic copper containing material to form nascent metallic copper and copper ions upon water addition to the mixture, and an inert solid absorbent.

RALPH L. EVANS.
EVERETT G. McDONOUGH.